US008946373B2

(12) United States Patent
Eling et al.

(10) Patent No.: US 8,946,373 B2
(45) Date of Patent: Feb. 3, 2015

(54) POLYUREAS PREPARABLE FROM TWO POLYETHERAMINES AND A PREPOLYMER

(75) Inventors: Berend Eling, Lemförde (DE); Stephan Göttke, Heidelberg (DE); Ben Buylinckx, Diessen (NL); Wolfgang Mägerlein, Mannheim (DE)

(73) Assignee: BASF SE, Ludwigshafen (DE)

( * ) Notice: Subject to any disclaimer, the term of this patent is extended or adjusted under 35 U.S.C. 154(b) by 171 days.

(21) Appl. No.: 13/321,323

(22) PCT Filed: May 19, 2010

(86) PCT No.: PCT/EP2010/056880
§ 371 (c)(1),
(2), (4) Date: Nov. 21, 2011

(87) PCT Pub. No.: WO2010/133630
PCT Pub. Date: Nov. 25, 2010

(65) Prior Publication Data
US 2012/0071623 A1 Mar. 22, 2012

(30) Foreign Application Priority Data
May 19, 2009 (EP) .................... 091606764

(51) Int. Cl.
C08G 18/32 (2006.01)
C08G 18/48 (2006.01)
C08G 18/10 (2006.01)
C08G 18/50 (2006.01)
C09D 175/02 (2006.01)

(52) U.S. Cl.
CPC ............ *C08G 18/4866* (2013.01); *C08G 18/10* (2013.01); *C08G 18/324* (2013.01); *C08G 18/4825* (2013.01); *C08G 18/5024* (2013.01); *C09D 175/02* (2013.01)
USPC .................... 528/64; 528/59; 528/61; 528/62; 528/65

(58) Field of Classification Search
CPC ............ C08G 18/6685; C08G 18/667; C08G 18/6681; C08G 18/10; C08G 18/12; C08G 18/4804; C08G 18/5024
USPC .................... 528/59, 61, 62, 64, 65
See application file for complete search history.

(56) References Cited

U.S. PATENT DOCUMENTS

| 3,654,370 | A | * | 4/1972 | Yeakey et al. .................. 564/480 |
| 4,866,103 | A | * | 9/1989 | Cassidy et al. ................. 521/159 |
| 5,013,813 | A | | 5/1991 | Zimmerman et al. |
| 5,100,997 | A | * | 3/1992 | Reisch et al. ................... 528/60 |
| 5,124,426 | A | | 6/1992 | Primeaux, II et al. |
| 5,162,388 | A | | 11/1992 | Primeaux, II |
| 5,171,818 | A | * | 12/1992 | Wilson ........................... 528/59 |
| 5,504,181 | A | | 4/1996 | Primeaux, II |
| 5,962,618 | A | | 10/1999 | Primeaux, II et al. |
| 6,797,798 | B2 | | 9/2004 | Johnston |
| 2003/0229195 | A1 | | 12/2003 | Super et al. |
| 2010/0298460 | A1 | | 11/2010 | Mijolovic et al. |
| 2011/0218259 | A1 | | 9/2011 | Eling et al. |
| 2011/0218262 | A1 | | 9/2011 | Eling et al. |
| 2011/0269863 | A1 | | 11/2011 | Kunst et al. |

FOREIGN PATENT DOCUMENTS

| CN | 1360609 A | 7/2002 |
| DE | 41 17 679 | 12/1991 |
| EP | 0 348 760 | 1/1990 |
| EP | 0 517 466 | 12/1992 |
| EP | 1 369 444 | 12/2003 |
| JP | 1-245010 | 9/1989 |
| JP | 4-175326 | 6/1992 |
| WO | WO 01/04181 A1 | 1/2001 |
| WO | 2009 095363 | 8/2009 |
| WO | 2011 107366 | 9/2011 |
| WO | 2011 107367 | 9/2011 |
| WO | 2011 107374 | 9/2011 |
| WO | 2011 135027 | 11/2011 |

OTHER PUBLICATIONS

U.S. Appl. No. 13/381,116, filed Dec. 28, 2011, Kunst, et al.
U.S. Appl. No. 61/309,473, filed Mar. 2, 2010, Eling, et al.
U.S. Appl. No. 61/329,569, filed Apr. 30, 2010, Kunst, et al.
U.S. Appl. No. 13/229,005, filed Sep. 9, 2011, Eling, et al.
Eling, B., "Coatings," The polyurethanes book, Editors: D. Randall and S. Lee, John Wiley & Sons, Ltd, pp. 363-378, (2002).
Sparrow, D., "Polyols," The polyurethanes book, Editors: D. Randall and S. Lee, John Wiley & Sons, Ltd, pp. 89-112, (2002).
Primeaux II, D. J., "Spray Polyurea Versatile High Performance Elastomer for the Polyurethane Industry," Polyurethanes 89, Proceedings of the SPI 32$^{nd}$ Annual Technical/Marketing Conference, San Francisco, California, pp. 126-130, (Oct. 1-4, 1989).
International Search Report Issued Jan. 31, 2011 in PCT/EP10/056880 Filed May 19, 2010.
Office Action issued Aug. 6, 2013 in Japanese Patent Application No. 2012-511279 (English translation only).

* cited by examiner

*Primary Examiner* — Michael L Leonard
(74) *Attorney, Agent, or Firm* — Oblon, Spivak, McClelland, Maier & Neustadt, L.L.P.

(57) ABSTRACT

The invention relates to a polyurea preparable from
a) a component A comprising
a1) 5 to 40% by weight of at least one polyetheramine 1 (PEA 1), obtainable from at least one polyetherpolyol 1 (PEP 1) and at least one amine 1, where PEP 1 has an equivalent weight of ≤500,
a2) 30 to 90% by weight of at least one polyetheramine 2 (PEA 2), obtainable from at least one polyetherpolyol 2 (PEP 2) and at least one amine 2, where PEP 2 has an equivalent weight of >500,
a3) 5 to 30% by weight of at least one amine chain extender and
b) a component B, which is a prepolymer, obtainable from
b1) at least one polyetherpolyol (PEP 3) and
b2) at least one isocyanate.

15 Claims, No Drawings

POLYUREAS PREPARABLE FROM TWO POLYETHERAMINES AND A PREPOLYMER

This application is a U.S. National Phase application under 35 U.S.C. §371 of PCT Application No. PCT/EP2010/056880, filed May 19, 2010, which claims priority under 35 U.S.C. §119 of European Patent Application No. 091606764, filed May 19, 2009.

The invention relates to polyureas which can be prepared by reacting a component A with a component B. The component A comprises two polyetheramines and an amine chain extender, the component B is a prepolymer which is obtainable from a polyetherpolyol and an isocyanate. Preferably, the polyureas according to the invention are prepared as spray formulation.

DE-A 41 17 679 relates to processes for the preparation of polyurethane/polyurea elastomers or polyurea elastomers by injection molding or reaction injection molding a reaction mixture with an A side and a B side. Here, the A side used is a polyisocyanate or a polyurethane prepolymer with isocyanate termination. The B side used is a polyol or a polyamine and a chain extender. The polyol is prepared using a double-metal cyanide complex catalyst (DMC catalyst). The polyamine is in turn prepared by grafting the polyol with an amine. If a polyurethane prepolymer is used in the A side, the prepolymers are based on the reaction of diphenylmethane diisocyanate (MDI) with diols, triols or high molecular weight polyols.

U.S. Pat. No. 6,797,798 discloses a spray-polyurea elastomer comprising the reaction product of a quasi-prepolymer mixture composition (component A) and a second organic compound which can react with isocyanate (compound B). Here, the compound A comprises an intermediate prepolymer comprising a reaction product of a first isocyanate composition and a first organic compound which can react with isocyanate. Furthermore, the component A) comprises a second isocyanate composition. For the preparation of the intermediate prepolymer present in component A), it is possible to use inter alia polyols, in particular polyetherdiols or -triols with an average molecular weight of ca. 1000 to 10 000. Of suitability as component B) are, for example, amine resins which comprise amine-terminated polyoxypropylenediamines having an average molecular weight of from 2000 to 5000 (for example the commercial product JEFFAMINE D-2000) or else also chain extenders such as the commercial product ETHACURE 100. However, U.S. Pat. No. 6,797,798 does not comprise any information about which catalyst is used to prepare the polyols or polyetherpolyols.

U.S. Pat. No. 5,962,618 discloses further spray-polyurea elastomers which can be prepared from amine resins of the JEFFAMINE type. These polyureas comprise a reaction product of a quasi-prepolymer, which is formed from an isocyanate and an active hydrogen-containing material, an amine resin, a chain extender, water and a functional alkoxysilane.

The spray polyurea elastomers described in U.S. Pat. No. 5,124,426 comprise, as component A, an isocyanate and, as component B, an amine-terminated polyoxyalkylenepolyol and also a chain extender. The component A can in turn be formed as quasi-prepolymer, where the isocyanate reacts with a polyol. The polyols used for the preparation of components A and B may also comprise the amine resins of the JEFFAMINE type described above.

An overview of the different types of polyureas and their use can be found in the article by B. Eling ("Coatings", The Polyurethanes Book; D. Randall, S. Lee (Editors), John Wiley & Sons (2002), pages 363 to 378). The polyols or polyetherpolyols which can be used for the polyurea preparation are described, for example, in the article by D. Sparrow ("Polyols"; The Polyurethanes Book; D. Randall, S. Lee (Editors), John Wiley & Sons (2002), pages 89 to 112). An overview of the preparation process of spray polyureas can be found in the article by D. J. Primeaux II (Proceedings of the SPI, 32nd Annual Technical/Marketing Conference, San Francisco, Calif. (Oct. 1-4, 1989), pages 126 to 130).

It is therefore not disclosed anywhere in the prior art that, for the preparation of polyureas, in one of the two components it is possible to use mixtures of polyetheramines which differ with regard to the equivalent weight of the polyetherpolyol used.

The object of the present invention is to provide further polyureas which can be prepared via a spray formulation. Compared with those from the prior art, the novel polyureas should have improved mechanical properties and/or be preparable in an economically simple manner (cost reduction).

The object is achieved by polyureas preparable from a) a component A comprising a1) 5 to 40% by weight of at least one polyetheramine 1 (PEA 1), obtainable from at least one polyetherpolyol 1 (PEP 1) and at least one amine 1, where PEP 1 has an equivalent weight of ≤500, a2) 30 to 90% by weight of at least one polyetheramine 2 (PEA 2), obtainable from at least one polyetherpolyol 2 (PEP 2) and at least one amine 2, where PEP 2 has an equivalent weight of >500, a3) 5 to 30% by weight of at least one amine chain extender and b) a component B, which is a prepolymer, obtainable from b1) at least one polyetherpolyol (PEP 3) and b2) at least one isocyanate.

The polyureas according to the invention have the advantage that the A component has a comparatively low viscosity and the polyureas, in particular the polyurea spray elastomers, have improved mechanical properties, for example with regard to their abrasion, their tensile strength, their elongation at break and/or their resistance to further tearing. Furthermore, they can be prepared in a very cost-effective way.

During the preparation of polyurea spray elastomers, it is advantageous if the viscosity of the A component is as low as possible in order to ensure good mixing of the A and B components. Moreover, the reactive components in the A and B component or the polyetherpolyols used have a nominal functionality of at least 2, normally between 2 and 3, often (approximately) 2. The nominal functionality of a polyetherpolyol or of a polyetheramine prepared therefrom is fixed or determined by the functionality of the starter molecule (initiator) which has been used for the particular synthesis of the polyetherpolyol. In this way, according to the invention largely linear polyurea polymers can be prepared, particularly when the functionality of the two components a1) and a2) and also, if appropriate, b) is at least 2, preferably (approximately) 2.

During the preparation of polyetherpolyols, for example polypropylene glycols, by means of KOH catalysis, unsaturations (for example terminally unsaturated compounds (monools) such as allyl alcohol as secondary products during the polymerization) are additionally formed. During the preparation of polypropylene glycols with an equivalent weight of less than 500, the amount of unsaturations is negligibly small, but in the case of higher molecular weight polyols, significant amounts of unsaturations are formed. These unsaturations have one hydroxyl group per molecule (functionality of 1). Although the nominal functionality of the molecules is 2, 3 or 4 depending on the starter molecule used, the actual (number-average) functionality, which, on account of the by-products formed during the polymerization (unsaturations) in the case of polymers according to the prior art, is (considerably) smaller than the nominal functionality, is significant. In the amination reaction of the polypropylene glycols, the unsaturations are also aminated. Accordingly, the polyetheramines also have an actual (real) functionality lower than the nominal functionality. In contrast to this, the content of unsaturations (unsaturated monool by-products during the polymerization) is significantly lower in the polyetherpolyols or polyetheramines of the present invention. Consequently, in the case of the polyetherpolyols or polyetheramines of the present invention, the actual functionality corresponds to the nominal functionality.

In polyurea systems with a linear structure, however, even small amounts of molecules with a reactive group result in a considerable reduction in the molecular weight of the polymer. Consequently, the properties are impaired as a result of the presence of such monofunctional compounds.

However, in order to achieve a relatively large molecular weight of the polymer, in the prior art it is normal to use polyetheramines, such as, for example, polyetheramine T5000 with a nominal functionality of 3. A disadvantage of adding the triamine is that the viscosity of the A component increases considerably as a result.

On the other hand, DMC catalysts can also be used for the preparation of the polypropylene glycols. The polypropylene glycols prepared by means of DMC catalysis generally comprise very small amounts of unsaturations. Accordingly, for these propylene glycols, the actual functionality is practically the same as the nominal functionality. It is known that the amount of catalyst used is dependent on the molecular weight of the prepared polyol. In the preparation of high molecular weight polyols, only small amounts of catalyst in the two-digit ppm range are needed, for the preparation of polypropylene glycols with an equivalent weight less than 500, such large amounts of catalyst are required that the preparation of such polyols by means of DMC catalysis becomes economically uninteresting.

The polyureas according to the invention thus have the advantage that the A component has a low viscosity and during the reaction of the A component with the B component, polyureas with a high molecular weight and good properties are formed.

Within the context of the present invention, the following definitions apply:

Hydroxyl value (OH value): a measure of the concentration of the hydroxyl groups (OH groups) in a polyol (polyetherpolyol), expressed as mg of the KOH equivalent to the hydroxyl groups in one gram of the corresponding polyol. The OH value is determined via the customary method DIN 53240. Unit: mgKOH/g Equivalent weight: corresponds to the number 56100 divided by the OH value.

Molecular weight: nominal functionality multiplied by the equivalent weight.

Isocyanate index: amount of isocyanate used divided by the theoretical amount of isocyanate, multiplied by 100.

Unsaturation number: a measure of the concentration of unsaturated end groups (for example allyl) in a polyol (polyetherpolyol), expressed as milliequivalents of the unsaturated species in one gram of the polyol. Unit: meq/g Total acetylatability: a measure of the concentration of reactive groups (—OH, —NH—, —NH$_2$), expressed in mg of a KOH equivalent to the reactive groups in one gram of a polyetheramine. Unit: mgKOH/g Total amine value (amine number): a measure of the concentration of amino groups (tertiary, secondary and primary), expressed as mg of a KOH equivalent to the reactive groups in one gram of a polyetheramine. Unit: mgKOH/g Degree of amination: [total acetylatability/total amine value]×100%

Nominal functionality: corresponds to the functionality of the starter molecule (initiator)

The polyureas according to the invention, preparable from a component A and a component B, are described in more detail below. Preferably, the polyurea according to the invention is prepared by reacting a component A with a component B. If appropriate, however, it is also possible to use two or more different components A and/or two or more different components B. In the polyurea according to the invention, the volume ratio of component A to component B is normally 1:1 to 1.5, preferably 1:1 to 1.2 and in particular 1:1. If appropriate, the component B can also be used in deficit.

The isocyanate index of the system (polyurea) is 80 to 150, preferably 90 to 130, further preferably 95 to 115.

The component A comprises 5 to 40% by weight of a component a1), 30 to 90% by weight of a component a2) and 5 to 30% by weight of a component a3). If appropriate, further components may also be present in the component A.

The component a1) is at least one polyetheramine 1 (PEA 1) obtainable from at least one polyetherpolyol 1 (PEP 1) and at least one amine 1, where PEP 1 has an equivalent weight of ≤500.

PEA 1 is prepared by methods known to the person skilled in the art, where PEP 1 and the amine 1 are reacted at elevated temperature and/or increased pressure in the presence of a transition metal catalyst and, if appropriate, hydrogen. The reaction can take place batchwise, but also continuously. As transition metal catalyst it is possible to use, for example, a copper- or nickel-containing catalyst. A suitable amine 1 is in principle any amine known to the person skilled in the art, including ammonia, where the amine may be a primary or, if appropriate, a secondary amine. Preference is given to using ammonia as amine 1. A polyetheramine according to component a1) is commercially available, for example under the trade name Polyetheramin D400 from BASF SE (Ludwigshafen, Germany). Polyetheramin D400 has a nominal functionality of 2 and a molecular weight of 400. PEA 1 normally has a nominal functionality of 2 to 4, preferably of 2 to 3, in particular of 2.

PEP 1 has an equivalent weight of ≤500, preferably 50 to 500, in particular 100 to 400. PEP 1 is preferably prepared using an alkali metal hydroxide catalyst (MOH catalyst), in particular using a potassium hydroxide catalyst (KOH catalyst). PEP 1 normally has a nominal functionality of 2 to 4, preferably of 2 to 3, in particular 2. However, the selection of the other process parameters for the preparation of PEA 2 can be made irrespective of the corresponding other process parameters for the preparation of PEA 1.

The starting materials used for the preparation of PEP 1 are known to the person skilled in the art, as are the other reaction conditions. Suitable starting materials are typically alkylene oxides or a mixture of alkylene oxides. Here, the alkylene oxide is condensed by means of chance or stepwise addition with an initiator comprising a plurality of hydroxyl groups to give PEP 1. Suitable alkylene oxides are ethylene oxide, propylene oxide, butylene oxide, amylene oxide or aralkylene oxide such as styrene oxide. Preferably, the alkylene oxide used is propylene oxide or a mixture thereof with up to 20% by weight of ethylene oxide, in particular propylene oxide. Suitable initiators (starters or starter molecules), which may be used, if appropriate, as mixtures, are aliphatic triols such as glycerol, propoxylated glycerol adducts, trimethylpropane, triethylpropane or diols such as ethylene glycol, 1,3-propylene glycol or butylene glycol. Preferably, PEP 1 is a polyoxypropylene polyetherpolyol.

The use of PEP 1 confers property advantages. For example, hardness and toughness of the polyurea according to the invention are significantly increased as a result of adding PEP 1.

The component a2) is at least one polyetheramine 2 (PEA 2) obtainable from at least one polyetherpolyol 2 (PEP 2) and at least one amine 2, where PEP 2 has an equivalent weight of >500.

PEA 2 differs from PEA 1 in that, during the preparation of PEA 2, a different polyetherpolyol (PEP 2) is used than during the corresponding preparation of PEA 1. Otherwise, the other process parameters of the preparation of PEA 2, such as catalyst or amine used, correspond to those which have been used in the preparation of PEA 1. However, the selection of the other process parameters for the preparation of PEA 2 can be made irrespective of the other process parameters for the preparation of PEA 1. This is also true for the corresponding preferred data. Thus (for example) the definition of amine 2 corresponds to that of amine 1, amine 2 is preferably ammonia. PEA 2 normally has a nominal functionality of from 2 to 4, preferably from 2 to 3, in particular of 2.

PEP 1 and PEP 2 differ in particular with regard to their equivalent weight, which in the case of PEP 2 is >500, preferably 550 to 10 000, in particular 600 to 5000. PEP 2 normally has a nominal functionality of from 2 to 4, preferably of from 2 to 3, in particular of 2. Preferably, PEP 2 is a polyoxypropylene polyetherpolyol.

The preparation of PEP 2 takes place by methods known to the person skilled in the art. The starting materials used for the preparation of PEP 2, including the preferred data and also the other process parameters, correspond to those for the preparation of PEP 1. However, the selection of the other process parameters for the preparation of PEP 2 can be made irrespective of the corresponding other process parameters for the preparation of PEP 1. It is in principle known to the person skilled in the art how polyetherpolyols of different equivalent weight can be prepared. Although KOH catalysts can also be used for the preparation of PEP 2 too, preference is given to using double-metal cyanide complex catalysts (DMC catalysts) for the preparation of PEP 2. Suitable DMC catalysts are known to the person skilled in the art. Preference is given to using a zinc hexacyanometallate catalyst.

The use of PEP 2 confers property advantages. For example, the elasticity and low-temperature flexibility of the polyurea according to the invention are significantly increased as a result of adding PEP 2.

The component a3) is at least one amine chain extender. The amine chain extender may be aromatic or aliphatic. A commercially available aliphatic amine chain extender is, for example, of the Baxxodur PC 136 type. Aromatic amine chain extenders are, for example, 3,5-diethyl-2,4-toluenediamine, 3,5-diethyl-2,6-toluenediamine, isophoronediamine, dimethylthiotoluenediamine, t-butyltoluenediamine, 1-methyl-3,5-diethyl-2,4-diaminobenzene, 1-methyl-3,5-diethyl-2,6-diaminobenzene, 3,5,3',5'-tetraethyl-4,4'-diaminodiphenylmethane or combinations thereof. Commercially available aromatic amine chain extenders are, for example, those of the DEDTA type (diethylenetoluenediamine) such as Lonzacure DEDTA 80, ETHACURE 100, ETHACURE 300 or Unilink 4200.

Component B is a prepolymer and is obtainable from the components b1) and b2). If appropriate, further components can also be used for the preparation of component B. The component b1) is at least one polyetherpolyol (PEP 3). The component b2) is at least one isocyanate.

PEP 3 may be any desired polyetherpolyol, for example PEP 3 can be the same compound as PEP 1 or PEP 2. PEP 3 normally has a nominal functionality of from 2 to 4, preferably of from 2 to 3 and in particular of 2. Preferably, PEP 3 corresponds to the above-described definition of PEP 2 including the respective preferred meanings. Consequently, PEP 3 is preferably likewise a polyoxypropylene polyetherpolyol or is prepared using a DMC catalyst. PEP 3 likewise preferably has an equivalent weight of >500, preferably 550 to 10 000, in particular 600 to 5000.

As isocyanate (component b2), it is possible to use any desired isocyanate known to the person skilled in the art. Suitable isocyanates are described, for example, in DE-A 10 2004 022 683. The isocyanates may be aromatic or aliphatic. Suitable aromatic isocyanates are diphenylmethane diisocyanate (MDI), polymethylenepolyphenyl isocyanate (PMDI), para-phenylene diisocyanate, naphthylene diisocyanate, liquid carbodiimide-modified MDI or toluene diisocyanate (TDI). The isocyanate is particularly preferably MDI. Preferred aliphatic isocyanates are isophorone diisocyanate (IPDI) and tetramethylxylene diisocyanate (TMXDI). Preference is given to using mixtures of 2,4' and 4,4'-MDI. Preferably, the fraction of 2,4'-MDI is 2 to 70% by weight, in particular 30 to 60% by weight.

The component B normally has an NCO value of from 10 to 20.

One preferred embodiment of the present invention relates to a polyurea preparable from a) a component A comprising a1) 5 to 40% by weight of at least one polyetheramine 1 (PEA 1), obtainable from at least one polyetherpolyol 1 (PEP 1) and at least one amine 1, where PEP 1 has an equivalent weight of 23 500 and an alkali metal hydroxide catalyst (MOH catalyst), in particular a potassium hydroxide catalyst (KOH catalyst), is used for the preparation of PEP 1, a2) 30 to 90% by weight of at least one polyetheramine 2 (PEA 2), obtainable from at least one polyetherpolyol 2 (PEP 2) and at least one amine 2, where PEP 2 has an equivalent weight of >500 and a double-metal cyanide complex catalyst (DMC catalyst) is used for the preparation of PEP 2, a3) 5 to 30% by weight of at least one amine chain extender and b) a component B, which is a prepolymer obtainable from b1) at least one polyetherpolyol (PEP 3), where PEP 3 has an equivalent weight of >500 and a DMC catalyst is used for the preparation of PEP 3, and b2) at least one isocyanate.

The polyurea according to the invention is preferably in the form of a spray formulation. The polyurea may be an elastomer and/or a coating. The polyurea according to the invention can be produced by customary preparation processes, for example by injection molding, reaction injection molding or by means of a spray formulation process, preferably by a spray formulation process.

During the preparation of the polyurea according to the invention, besides the above-described components A and B, further components may also be present. These further components can be admixed beforehand with or added to component A and/or component B. If appropriate, the further components can also be introduced directly into the polyurea preparation process. The further components may either be an individual component or a mixture of two or more components. The further components comprise, for example, propellants such as water and/or readily volatile organic substances, for example pentane or chloroform, HCFC 141b, HFC-134a, HFC-245fa, HFC-365mfc or diethyl ether. Similarly, inert gases may be used as propellants. Besides propellants, it is also possible to use other additives such as dyes, biocides, plasticizers, mold release agents, fillers, reactive and nonreactive thinners, adhesion promoters, fillers or pigments. Propylene carbonate is used as reactive thinner, epoxy silanes as adhesion promoters, calcium carbonate as filler, titanium dioxide as pigment.

The present invention thus also further provides a process for the preparation of the polyureas according to the invention, in which at least one component A is reacted with at least one component B. Preferably, this is a spray formulation process. The processes as such are known to the person skilled in the art.

The examples below illustrate the polyureas according to the invention and also the process for their preparation. Unless stated otherwise, all of the fractions are listed in percent by weight (% by weight).

EXAMPLES

Example 1

Synthesis of Polyetherpolyols (Polyol 1 to Polyol 3)

Polvol 1 (by Means of KOH Catalysis):

The synthesis is carried out in a cleaned and dried 10 liter stirred autoclave. 0.525 kg of dipropylene glycol and 0.034 kg of a solution of 47.5% aqueous KOH solution are placed in the stirred reactor. The reactor contents are rendered inert with nitrogen and treated under reduced pressure for a total of 1 hour at 120° C. and dried to a water concentration of about 0.02%. Then, 6.167 kg of propylene oxide are metered in over 4 hours. When the metered addition is complete, the mixture is afterstirred to constant pressure and then the reaction mixture is degassed at 105° C. and 10 mbar. The resulting product had an OH value of 59 mg KOH/g and is treated with 500 ppm of Irganox 1135 as antioxidant prior to further use. The unsaturation number of polyol 1 is 0.048 meq/g, the equivalent weight is 950.

Polvol 2 (by Means of DMC Catalysis):

The synthesis is carried out in a cleaned and dried 10 liter stirred autoclave in accordance with Example 1 from DE 10 2004 047 406. 1.833 kg of starter compound are placed in the stirred reactor and treated with 125 ppm of a multimetal cyanide compound, prepared from zinc acetate and hexacyanocobaltic acid, in the presence of a surface-active agent in accordance with example 1 of EP 0 862 947. The starter compound is a difunctional propylene glycol propoxylate with an OH value of 240 mg KOH/g, prepared by KOH catalysis with subsequent removal of the basic catalyst.

The reactor contents are rendered inert with nitrogen and treated under reduced pressure for a total of 1 hour at 120° C. At 120° C., 6.167 kg of propylene oxide are metered in over 4 hours. When the metered addition is complete, the mixture is afterstirred to constant pressure and then the reaction mixture is degassed at 105° C. and 10 mbar. The resulting product has an OH value of 55 mg KOH/g and is treated with 500 ppm of Irganox 1135 as antioxidant prior to further use. The unsaturation number of polyol 2 is 0.003 meq/g, the equivalent weight is 1020.

Polyol 3 (by Means of KOH Catalysis):

The synthesis is carried out in a cleaned and dried 10 liter stirred autoclave. 2.56 kg of dipropylene glycol and 0.034 kg of a solution of a 47.5% aqueous KOH solution are placed in the stirred reactor. The reactor contents are rendered inert with nitrogen and treated under reduced pressure for a total of 1 hour at 120° C. and dried to a water concentration of about 0.02%. Then, 5.344 kg of propylene oxide are metered in over 4 hours. When the metered addition is complete, the mixture is afterstirred to constant pressure and then the reaction mixture is degassed at 105° C. and 10 mbar. The resulting product has an OH value of 278 mg KOH/g and is treated with 500 ppm of Irganox 1135 as antioxidant prior to further use. The unsaturation number of polyol 3 is 0.004 meq/g, the equivalent weight is 200.

Example 2

Synthesis of Polyetheramines (PPDA1 to PPDA3)

In the present example, polyoxypropylenediamines with terminal primary amine functions are prepared. The polyetheramines are prepared in a process in which the parent polyoxypropylene polyetherpolyol according to example 1 is exposed to ammonia and hydrogen at elevated temperature and increased pressure in the presence of a transition metal catalyst. This amination step produces primarily primary amine functions, the content of secondary and tertiary amines here is less than 1% based on the amine content.

A continuously operated high-pressure fixed-bed reactor is filled with 500 ml of an $Ni/Co/ZrO_2$ catalyst, which is prepared as described in EP-A 0 696 529 (catalyst A). 100 g per h of the corresponding polyol and 210 g per h of liquid ammonia are fed into the reactor. The catalyst temperature is adjusted to 195° C. and the reactor is filled with 120 bar hydrogen. The reactor outlet, after decompression, is distilled in order to remove ammonia and water.

The polyoxypropylene polyetherpolyol with a nominal functionality of 2 and an OH value of 59 mg KOH/g (polyol 1 from example 1 with KOH catalyst) is converted to a polyoxypropylenediamine with terminal primary amine function (PPDA1). The amine number of the distillation residue is 57 mg KOH/g. The acetylation number is 61.5 mg KOH/g. The degree of amination based on the quotient of amine number and acetylation number is 92.7%.

The polyoxypropylene polyetherpolyol with a nominal functionality of 2 and an OH value of 55 mg KOH/g (polyol 2 from example 1 with DMC catalyst) is converted to a polyoxypropylenediamine with terminal primary amine function (PPDA2). The amine number of the distillation residue is 50.7 mg KOH/g. The acetylation number is 54.0 mg KOH/g. The degree of amination based on the quotient of amine number and acetylation number is 93.9%.

The polyoxypropylene polyetherpolyol with a nominal functionality of 2 and an OH value of 278 mg KOH/g (polyol 3 from example 1 with KOH catalyst) is converted to a polyoxypropylenediamine with terminal primary amine function (PPDA3). The amine number of the distillation residue is 247 mg KOH/g.

Example 3

Synthesis of Prepolymers According to Component B

A prepolymer 1 is prepared from MDI and a polyoxypropylene polyetherpolyol. (Polyol 1 from example 1). The MDI comprises in each case to 50% by weight the 2,4'-isomer and the 4,4'-isomer (51.0% by weight). Polyol 1 has a nominal functionality of 2 and an OH value of 59 mg KOH/g. It is prepared in the presence of KOH as catalyst (49% by weight). The unsaturation number of polyol 1 is 0.048 meq/g, the equivalent weight is 950.

Prepolymer 2 is prepared correspondingly to prepolymer 1, but instead of polyol 1, the polyol 2 is used, which has a nominal functionality of 2 and an OH value of 240 mg KOH/g, but is prepared using a DMC catalyst and has an unsaturation number of 0.003 meq/g. The equivalent weight is 1020.

The prepolymers 1 and 2 are prepared by standard processes at a batch temperature of 80° C. and a reaction time of 2 hours.

Example 4

Preparation of the Polyurea

In the example below, the A component used is a base formulation with the following component:
polyetheramine 2: PPDA1 or PPDA2, in each case to 63.1% by weight
polyetheramine 1: PPDA3 to 17.05% by weight
amine chain extender: ETHACURE 100 to 19.85% by weight ETHACURE 100 is a commercially available amine chain extender from Albemarle Corporation. It comprises an 80/20 mixture of 3,5-diethyl-2,4-toluenediamine and 3,5-diethyl-2,6-toluenediamine.

The A component (using the above base formulation) is reacted with the B component (one of the prepolymers according to example 3) to give a polyurea spray formulation (elastomer), where a mixing ratio of A component to B component of 100 to 109 is used. Here, an isocyanate index of 104 is attained arithmetically. The spraying equipment used is that from Graco (Graco Reactor E-XP 2-dispensing unit), which is equipped with a Graco fusion spray gun, model AR 2929. The temperature of the components used is 75° C., the pressure is 160 to 170 bar. The polyurea prepared in this way is sprayed onto a plastic sheet (panel) which is coated with a mold releaser. The polyurea coatings are removed from the plastic sheet by carefully pulling one corner of the coating.

In this way, the following polyurea coatings (A-D) are prepared:

TABLE 1

|  | Polyurea Coating A | Polyurea Coating B | Polyurea Coating C | Polyurea Coating D |
|---|---|---|---|---|
| A component |  |  |  |  |
| PPDA1 | 63.1 | 63.1 |  |  |
| PPDA2 |  |  | 63.1 | 63.1 |
| PPDA3 | 17.05 | 17.05 | 17.05 | 17.05 |
| Ethacure 100 | 19.85 | 19.85 | 19.85 | 19.85 |
| B component |  |  |  |  |
| Prepolymer 1 | 109 |  |  | 109 |
| Prepolymer 2 |  | 109 | 109 |  |

The mechanical properties of these polyurea coatings are measured after the respective samples are stored for two weeks at room temperature and 50% humidity (see table 2).

TABLE 2

|  | Polyurea Coating A | Polyurea Coating B | Polyurea Coating C | Polyurea Coating D |
|---|---|---|---|---|
| Density (g/cm$^3$) | 0.998 | 1.005 | 1.004 | 1.008 |
| Shore hardness A/D | 95/40 | 95/42 | 96/43 | 95/41 |
| Tensile strength | 22 | 23 | 27 | 26 |

TABLE 2-continued

|  | Polyurea Coating A | Polyurea Coating B | Polyurea Coating C | Polyurea Coating D |
|---|---|---|---|---|
| Elongation at break (%) | 420 | 450 | 490 | 500 |
| Resistance to further tearing | 58 | 61 | 68 | 64 |
| Abrasion resistance (DIN 4649, mm$^3$) | 173 | 158 | 134 | 144 |

We claim:
1. A polyurea, obtained by a process comprising reacting
a) a component A comprising
a1) 5 to 40% by weight of at least one first polyetheramine (PEA 1), obtained by a process comprising reacting at least one first polyetherpolyol (PEP 1) and at least one first amine, wherein the PEP 1 has an equivalent weight of ≤500, and the PEA 1 has a nominal functionality of 2,
a2) 30 to 90% by weight of at least one second polyetheramine (PEA 2), obtained by a process comprising reacting at least one second polyetherpolyol (PEP 2) and at least one second amine, wherein the PEP 2 has an equivalent weight of >500, and the PEA 2 has a nominal functionality of 2, and
a3) 5 to 30% by weight of at least one aromatic amine chain extender
and
b) a component B, obtained by a process comprising reacting
b1) at least one third polyetherpolyol (PEP 3), where PEP3 has an equivalent weight of >500 and a nominal functionality of 2, and
b2) at least one isocyanate
wherein the component B is a prepolymer.
2. The polyurea of claim 1, wherein the PEP 2 is obtained by a process comprising reacting an alkylene oxide and an initiator in the presence of a double-metal-cyanide complex catalyst (DMC catalyst).
3. The polyurea of claim 1, wherein the PEP 3 is obtained by a process comprising reacting an alkylene oxide and an initiator in the presence of a DMC catalyst.
4. The polyurea of claim 1, wherein the PEP 1 is obtained by a process comprising reacting an alkylene oxide and an initiator in the presence of an alkali metal hydroxide catalyst (MOH catalyst).
5. The polyurea of claim 4, wherein the MOH catalyst is a potassium hydroxide catalyst (KOH catalyst).
6. The polyurea of claim 1, wherein the at least one first amine or the at least one second amine is ammonia.
7. The polyurea of claim 1, wherein the PEP 1, the PEP 2, or PEP 3 is a polyoxypropylene polyetherpolyol.
8. The polyurea of claim 1, wherein the isocyanate is diphenylmethane diisocyanate (MDI).
9. A process for the preparation of the polyurea of claim 1, the process comprising:
reacting at least one component A with at least one component B.
10. The process of claim 9, wherein the reacting is carried out by spray formulating.
11. The polyurea of claim 1, wherein the at least one first amine is ammonia.
12. The polyurea of claim 1, wherein the at least one second amine is ammonia.
13. The polyurea of claim 1, wherein the PEP 1 is a polyoxypropylene polyetherpolyol.

14. The polyurea of claim 1, wherein the PEP 2 is a polyoxypropylene polyetherpolyol.

15. The polyurea of claim 1, wherein the PEP 3 is a polyoxypropylene polyetherpolyol.

* * * * *